Patented Dec. 22, 1942

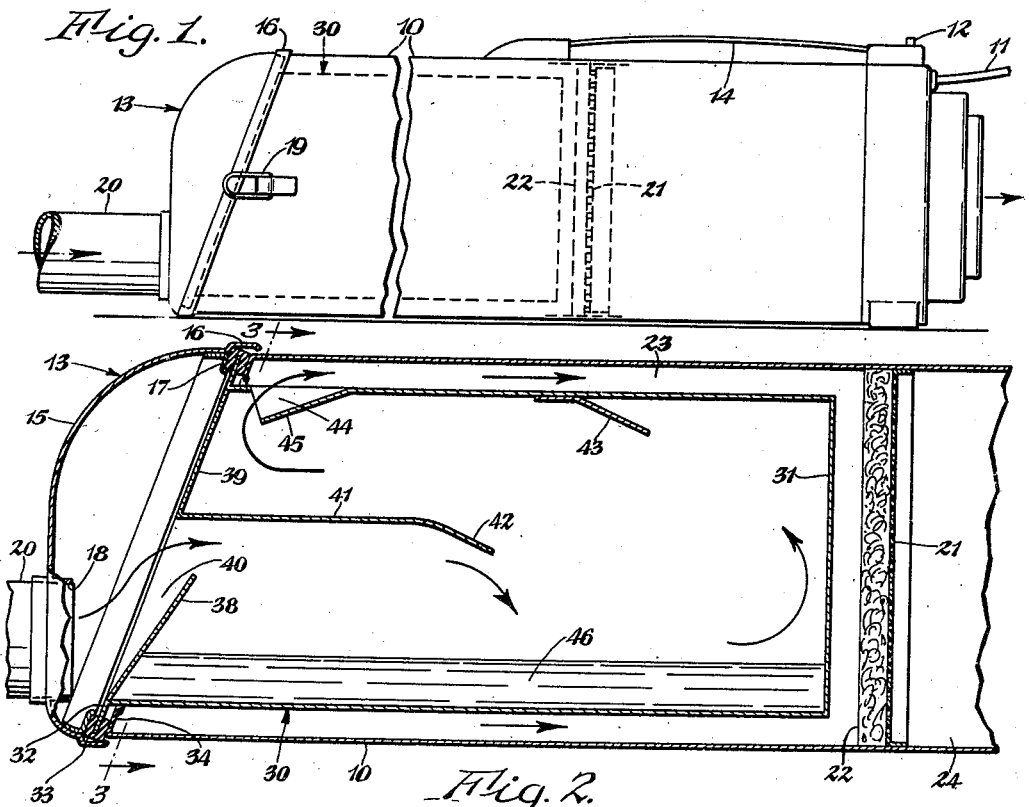

2,306,212

UNITED STATES PATENT OFFICE 2,306,212

LIQUID SUCTION DEVICE

William Gerstmann, Buffalo, N. Y.

Application March 25, 1941, Serial No. 385,082

1 Claim. (Cl. 183—21)

This invention relates to a liquid suction device and more particularly to such a device which is used for cleaning up liquids on floors, rugs, and the like, and which can also be used as an air washer or for fumigating, deodorizing and humidifying a room.

The principal object of the present invention is to provide such a suction device which is inexpensive and simple in construction and which can be readily used in conjunction with a conventional household vacuum cleaner.

Another object is to provide such a suction device which can replace the filter bag of a conventional household vacuum cleaner and thereby be incorporated directly in the vacuum cleaner.

Another object is to provide such a cleaning device which simply and effectively collects the liquid cleaned up in a container which can be easily emptied and replaced.

Another purpose is to provide such a device which can be effectively used as an air washer or for fumigating, deodorizing and humidifying a room.

Other advantages of the present invention will be readily apparent from the following detailed description, reference being made to the drawing, wherein:

Fig. 1 is a fragmentary side elevation of a conventional household vacuum cleaner incorporating the present invention.

Fig. 2 is a vertical, longitudinal, fragmentary, central section, on an enlarged scale, of the device shown in Fig. 1.

Fig. 3 is a substantially vertical, transverse section thereof, taken on line 3—3, Fig. 2.

The invention is shown as embodied in a conventional household vacuum cleaner of the portable type although any suitable form of suction producing means can be employed. The portable vacuum cleaner in general comprises a casing 10 of tubular form in cross-section, an electric motor (not shown) arranged in one end of the casing 10 and adapted to be energized through a line 11 and also adapted to be turned on and shut off by an electrical switch 12, a removable head 13 arranged on the opposite end of the casing 10, and a handle 14 arranged on top of the casing. The removable head 13 is shown as being connected to the casing 10 along a transverse angular line and this head includes a shell 15, the edge of which is offset slightly, as indicated at 16, an annular abutment in the form of an angle 17 arranged on the inside of the tubular casing 10 immediately adjacent the offset 16, and an opening 18 provided in the front wall of the shell 15. The head 13 is removably secured to the tubular casing 10 by one or more fasteners 19, or in any other suitable manner. A hose 20 is suitably connected at one end in the opening 18 in the head 13, the opposite end of this hose 20 being provided with a conventional suction nozzle (not shown) such as is commonly used with household vacuum cleaners. Substantially centrally of the tubular casing 10, the same is provided with a perforated wall 21 on the forward side of which is arranged an air filter element 22. A chamber 23 thus provided between the filter 22 and the removable head 13 normally houses the conventional dirt filter bag (not shown) and the compartment 24 formed on the opposite side of the wall 21 houses the electric motor and suction fan unit (not shown). It will therefore be seen that air is permitted to be sucked in through the hose 20, through the opening 18 in the head 13, through the chamber 23, through the filter 22 and perforated wall 21, through the compartment 24, and discharged through an air discharge opening (not shown) in the opposite end of the vacuum cleaner, the direction of air movement being shown by arrows in Fig. 1.

In accordance with the present invention the chamber 23, normally occupied by the conventional dirt filter bag (not shown), houses a liquid separating and collecting container, indicated generally at 30. This container 30 is shown as being of tubular form and as including an imperforate end wall 31 and being open at its opposite end. The container 30 is formed to provide a continuous annular flange 32 arranged at an angle to the axis of the casing 10, the plane of which flange is parallel with the angular line of connection between the casing 10 and the removable head 13, and this annular flange 32 carries a sealing ring 33 on its outer edge, as best shown in Fig. 2. The flange 32 is interposed between the head 13 and casing 10 and the sealing ring 33 of rubber or any other suitable matter engages with the annular abutment 17 and an annular shoulder 34 formed on the open end of the casing 10. It will thus be seen that the tubular container 30 is arranged and held in substantially coaxial relation to the tubular casing 10 so that an annular space is provided between the container 30 and the surrounding casing 10, as best shown in Fig. 2.

To compel the liquid laden air to travel a circuitous path so that opportunity is afforded for the liquid to separate from the air and be collected in the bottom of the container 30 and also for the air to be discharged, baffle means are provided which are preferably constructed as follows:

At the bottom of the mouth or open end of the liquid separating and collecting container 30, a baffle 38 is provided which extends transversely of the container and slopes upwardly and rearwardly into the container. A wall 39 is provided at the top of the mouth of the container 30 which extends transversely of the container and downwardly parallel with the angular line of connection between the head 13 and the casing 10 to a point approximately half way the depth of the container 30. An inlet opening 40 to the container is thus provided between the baffle 38 and the wall 39 and this opening 40 produces communication between the hose 20 and the interior of the container 30. A horizontal shelf, partition or baffle 41 extends horizontally inwardly of the container 30 the full width thereof from the lower end of the wall 39 to a point approximately half the length of the container and at its rear or inner end this partition 41 is formed to provide a downwardly and rearwardly extending deflecting lip 42. A baffle 43 is shown as being arranged on the underside of the top of the container 30 a slight distance in rear of the lip 42 and this baffle 43 slopes downwardly and rearwardly a short distance from the top of the container and extends across the full width of the container 30. The air discharge outlet 44 for the container 30 is preferably located in the top of the container and is formed by a section of the top of the container being struck downwardly into the container, as indicated at 45, thereby to provide a baffle.

The liquid laden air sucked in through the hose 20 impinges against the baffle 38 and is deflected upwardly and inwardly of the container 30 against the partition 41 whereupon some of the liquid is knocked out or separated from the mixture and is collected on the bottom of the container to form the body of separated and collected liquid 46. The lip 42 aids in directing the liquid laden air downwardly against the body of liquid 46 and causes further separation of the liquid from the air. After being deflected by the body of liquid 46 the still partially liquid laden air mixture is directed against the rear end wall 31 of the container 30 with further separation of the liquid from the air whereupon the impeding baffle 43, upper surfaces of the lip 42 and partition 41, and the baffle 45 providing the discharge outlet 44 of the container, all cooperate to produce complete separation of the liquid from the air, the liquid draining off the various baffles and being collected in the body of liquid 46 in the bottom of the container and the air being discharged from the container through the discharge opening therein. Thus the liquid laden air is caused to follow a circuitous path in order to effect a complete separation of the liquid from the air, this path of movement being indicated generally by the arrows in Fig. 2.

After being discharged through the discharge opening 44 in the container 30 the air is drawn rearwardly through the space provided between the opposing peripheries of the container 30 and the casing 10, through the filter 22, perforated wall 21, and finally discharged from the opposite end of the vacuum cleaner.

It will be noted that the sealing ring 33 prevents leakage through the joint between the head 13 and the casing 10 and further that the only opening to the interior of the container 30 for the liquid laden air mixture is through the inlet opening 40.

The above organization embodying my invention has been found to be exceedingly successful in producing a complete separation of the liquid from the air, particularly when cleaning rugs that have been shampooed with a cleaning liquid.

While the operation of the invention has been described as a suction cleaning device it is readily apparent that the invention can be used as an air cleaner. For this purpose by providing a body of water or other suitable cleaning liquid in the container 30 and drawing or sucking dust laden air through the respective container and causing this air to travel the circuitous path described above, the dust and dirt will be collected in the body of liquid and the air thereby cleaned.

It will further be seen if a body of fumigant, deodorant or water is placed in the container the apparatus can be employed to fumigate, deodorize or humidify a room.

From the foregoing it will be seen that the present invention provides a simple, compact and inexpensive liquid suction device which can be used either to clean up liquids on floors, rugs and the like, or as an air washer, or can be used to fumigate, deodorize or humidify a room.

I claim as my invention:

In combination with a household vacuum cleaner having an elongated tubular casing arranged with its axis horizontally disposed and having one end open and its opposite end provided with a suction conduit and a head fitting over said open end and having an air inlet; means arranged within said casing for separating and collecting liquid from a liquid and air mixture drawn in through said inlet, comprising an elongated tubular container having one end open and its opposite end provided with an end head, means at the open end of said container and interposed between said casing and head for supporting said container in coaxial relation within said casing and with an annular space between the walls thereof, a transverse baffle across the lower part of the open end of said container and secured to impound a body of liquid in the bottom of said container, and a second transverse baffle in said container extending downwardly from the upper part of said container at the open end thereof to a point short of said first baffle and thence generally horizontally and centrally of said container and terminating short of the end head thereof to provide a lower horizontal pass through which the air entering said inlet passes horizontally over said body of water and thence upwardly between the end of the horizontal part of said second baffle and the end head of said container and to provide an upper horizontal pass through which said air continues horizontally toward the open end of said container and out through an opening provided in the upper part of said container adjacent the open end thereof and into said annular space, and said air continuing horizontally through said annular space between said container and said casing to the suction conduit of said casing.

WILLIAM GERSTMANN.